US007716543B2

(12) United States Patent
Grimes et al.

(10) Patent No.: US 7,716,543 B2
(45) Date of Patent: May 11, 2010

(54) METHODS AND SYSTEMS FOR ELIMINATING TEST SYSTEM REBOOTS BETWEEN FUNCTIONAL TESTS OF HOST ADAPTER BOARDS

(75) Inventors: Keith Grimes, Colorado Springs, CO (US); Todd Jeffrey Egbert, Colorado Springs, CO (US); Edmund Paul Fehrman, Monument, CO (US)

(73) Assignee: LSI Corporation, Milpitas, CA (US)

( * ) Notice: Subject to any disclaimer, the term of this patent is extended or adjusted under 35 U.S.C. 154(b) by 530 days.

(21) Appl. No.: 11/266,056

(22) Filed: Nov. 2, 2005

(65) Prior Publication Data
US 2007/0101200 A1    May 3, 2007

(51) Int. Cl.
*G06F 11/00* (2006.01)
*G06F 3/00* (2006.01)
*G06F 13/00* (2006.01)
*G01R 27/28* (2006.01)

(52) U.S. Cl. .................. 714/724; 714/25; 714/30; 714/44; 714/56; 714/712; 710/4; 710/12; 710/300; 710/301; 710/302; 710/303; 710/304; 702/118

(58) Field of Classification Search .............. 714/25, 714/712, 30, 44, 56; 710/4, 12, 300–304; 702/118
See application file for complete search history.

(56) References Cited

U.S. PATENT DOCUMENTS

| 5,611,057 | A  | * | 3/1997  | Pecone et al.    | 710/301 |
|-----------|----|---|---------|------------------|---------|
| 5,659,680 | A  | * | 8/1997  | Cunningham et al.| 714/25  |
| 5,706,300 | A  | * | 1/1998  | Wedel            | 714/724 |
| 5,943,482 | A  | * | 8/1999  | Culley et al.    | 710/302 |
| 5,999,989 | A  | * | 12/1999 | Patel            | 710/1   |
| 6,185,630 | B1 | * | 2/2001  | Simmons          | 710/10  |
| 6,202,103 | B1 | * | 3/2001  | Vonbank et al.   | 710/15  |
| 6,202,117 | B1 |   | 3/2001  | Gates            | 710/129 |
| 6,363,452 | B1 | * | 3/2002  | Lach             | 710/316 |
| 6,516,366 | B1 | * | 2/2003  | Gates et al.     | 710/105 |
| 6,532,558 | B1 | * | 3/2003  | Allen et al.     | 714/724 |
| 6,754,817 | B2 | * | 6/2004  | Khatri et al.    | 713/1   |
| 6,959,257 | B1 | * | 10/2005 | Larky et al.     | 702/120 |
| 7,020,815 | B2 | * | 3/2006  | Jeddeloh         | 714/718 |
| 2002/0016877 | A1 | * | 2/2002 | Porterfield      | 710/100 |
| 2003/0135683 | A1 | * | 7/2003 | Moy              | 710/305 |
| 2004/0122990 | A1 | * | 6/2004 | Meyer et al.     | 710/8   |
| 2005/0138490 | A1 |   | 6/2005 | Grimes et al.    | 714/56  |

OTHER PUBLICATIONS

PCI SIG, "PCI local Bus Specification" Revision 3.0, Feb. 2004, pp. 37-38, 216-218, 229-231. 295-305.*

(Continued)

*Primary Examiner*—Robert Beausoilel
*Assistant Examiner*—Jeison C Arcos
(74) *Attorney, Agent, or Firm*—Kermit D. Lopez; Luis M. Ortiz; Ortiz & Lopez, PLLC

(57) ABSTRACT

A method and system for testing a modular data-processing component. Register information associated with a modular data-processing component to be tested at a test location can be identified and stored. The modular data-processing component can then be tested and removed from said test location. Thereafter, the register information can be retrieved and provided for use with testing of a new data-processing component at said test location without losing said register information during testing of multiple modular data-processing components. The register information can be, for example, PCI configuration data and the modular data-processing component can be an HAB.

17 Claims, 4 Drawing Sheets

OTHER PUBLICATIONS

*LSI22902/22903 Host Adapter to Intel ISP1100 Internet Server Quick Installation Guide*, LSI Logic, Nov. 2000.

*LSI8750SP PCI to Ultra SCSI Host Adapter Users Guide*, LSI Logic, Nov. 2000.

* cited by examiner

METHODS AND SYSTEMS FOR ELIMINATING TEST SYSTEM REBOOTS BETWEEN FUNCTIONAL TESTS OF HOST ADAPTER BOARDS

TECHNICAL FIELD

Embodiments generally relate to data-processing methods and systems. Embodiments also relate to Host Adapter Board (HAB) components. Embodiments additionally relate to peripheral component interconnect (PCI) local bus architectures.

BACKGROUND

A host adapter board ("HAB") plugs into a host computer system to provide added functionality to the computer system. For example, the HAB facilitates communication between a peripheral component interconnect ("PCI") bus of the host computer system and a peripheral device (e.g., a storage subsystem, a network communication medium, etc.). The HAB often includes one or more components that provide the interface to the PCI bus and one or more components (e.g., an I/O controller) that provide interfacing to the peripheral device.

The PCI bus standards define certain PCI signal timing specifications. The PCI bus signal standards may be found, for example, at http://www.pcisig.com/specifications. Among the signaling standards specified therein are slew rate and clock-to-signal-valid delay. "Slew rate" defines a maximum rate of change in an output signal, for example four volts per nanosecond within a defined operating voltage range. "Clock-to-signal-valid" delay defines the time (e.g., five nanoseconds) between an initial clock signal and a ready state, which can be used to initiate data transfer to the HAB. To function properly, the HAB must process PCI signals from the bus within these PCI timing specifications.

One of the problems with current manufacturing tests for HAB and other modular data-processing components is that the operators or users are required to manually reboot the test system or select an option that will reboot the test system once they have changed out the HAB under test. In a manufacturing environment, the test system remains powered up while the slot for the HAB is powered down. This allows the operator to change out the HAB being tested. The PCI configuration, however, is lost. Without the PCI configuration information, the test system is unable to communicate to the HBA. Rebooting is required in order for the test system to communicate with the PCI or other similar card and the entire configuration space must be re-build for all associated devices found on the PCI bus. This process of rebooting and recreating the PCI configurations is very time consuming and costly in a manufacturing environment.

In the HAB functional test side of manufacturing, one of the main concerns is testing time. Because rebooting a system is factored into the testing time, test times are large and costly. There have been some approaches implemented for solving the reboot time consumption. The current solution involves rebooting the system and having the PCI configurations restored during the reboot process. The reboot process, however, is also time consuming and adds to the manufacturing costs of such HAB's.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved an improved testing method and system.

It is another aspect of the present invention to provide for a testing methodology that eliminates the need for test system reboots between functional testing of modular data-processing components such as Host Adapter Boards (HABs).

The aforementioned aspects of the invention and other objectives and advantages can now be achieved as described herein. A method and system for testing a modular data-processing component are disclosed. In general, register information associated with a modular data-processing component to be tested at a test location can be identified and stored. The modular data-processing component can then be tested and removed from said test location. Thereafter, the register information can be retrieved and provided for use with testing of a new data-processing component at said test location without losing said register information during testing of multiple modular data-processing components. The register information can be, for example, PCI configuration data and the modular data-processing component can be an HAB.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
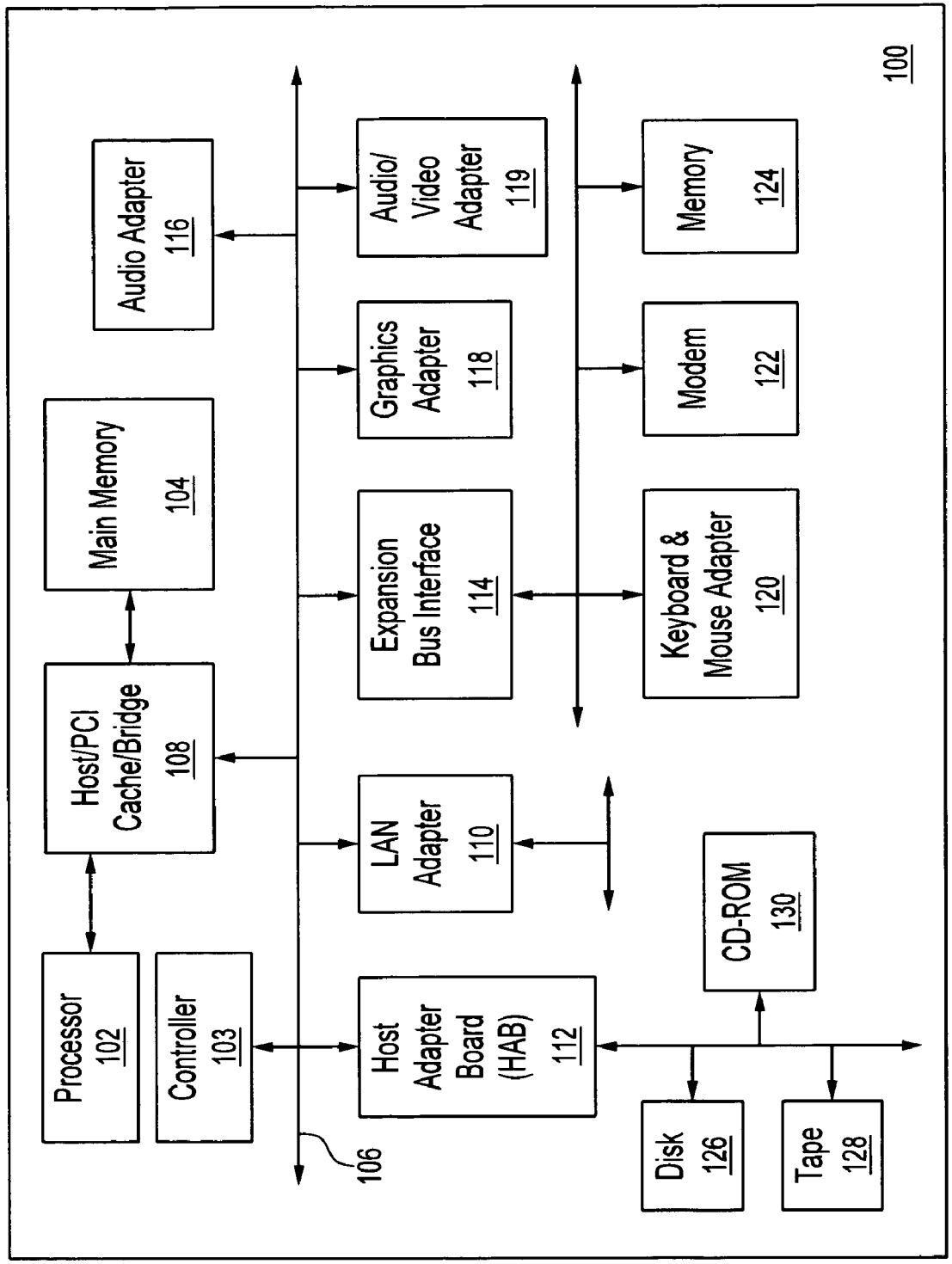
FIG. 1 illustrates a block diagram of a data-processing system in which an embodiment may be implemented.

With reference now to the figures, and in particular with reference to FIG. 1, a block diagram of a data processing system 100 in which the present invention may be implemented is illustrated. The depicted example is not meant to imply architectural limitations with respect to embodiments of the present invention, but is presented for general illustrative and edification purposes only. The present invention can be embodied with a data processing system such as system 100 or other data processing systems, such as, for example, a storage array controller.

Data processing system 100 can employ a peripheral component interconnect (PCI) local bus architecture. Although the depicted example employs a PCI bus, other bus architectures such as Micro Channel and ISA may be utilized, in accordance with alternative embodiments of the present invention. A Processor 102 and a main memory 104 can be connected to PCI local bus 106 through PCI bridge 108. PCI bridge 108 also may include an integrated memory controller and cache memory for processor 102. Alternatively, a controller 103 can communicate with PCI local bus 106 to provide additional architectural support. Controller 103 may be utilized in place of or to complement an integrated memory controller and cache memory for processor 102. Controller 103 can be implemented, for example, as a PCI-based memory controller for control of memory 104 and associated components. Memory 104 can be implemented as a main memory for data-processing system 100.

Thus, the controller 103 (e.g. memory controller) can communicate with the main memory 104 of system 100 via bus 106. Of course, while the memory controller 103 and the main memory 104 are suitable for use within a computer system such as the system 100 illustrated in FIG. 1, it should be clearly understood that such a use is but one of a wide variety of suitable uses for the memory controller 103 and the main memory 104. Accordingly, while the term "main" is used in conjunction with the memory 104 in view of the disclosed use thereof within the computer system 100, the term should not be seen as limiting any specific embodiment thereof. Furthermore, while computer systems or data-processing systems such as the system 100 typically include one or more memory devices in addition to the main memory, it should be clearly understood that the memory controller 103 and the main memory 104 may collectively be viewed as a memory subsystem suitable for use within a computer system or another memory-demanding electronic device.

Additional connections to PCI local bus 106 may be made through direct component interconnection or through add-in boards. In the depicted example, local area network (LAN) adapter 110, host adapter board (HAB) 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. HAB 112 can provide a connection for a hard disk drive 126, tape drive 128, a CD-ROM 130 and/or other components as in the depicted example.

Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disc drives and the like may be used in addition to or in place of the hardware depicted in FIG. 1.

Figure 2:
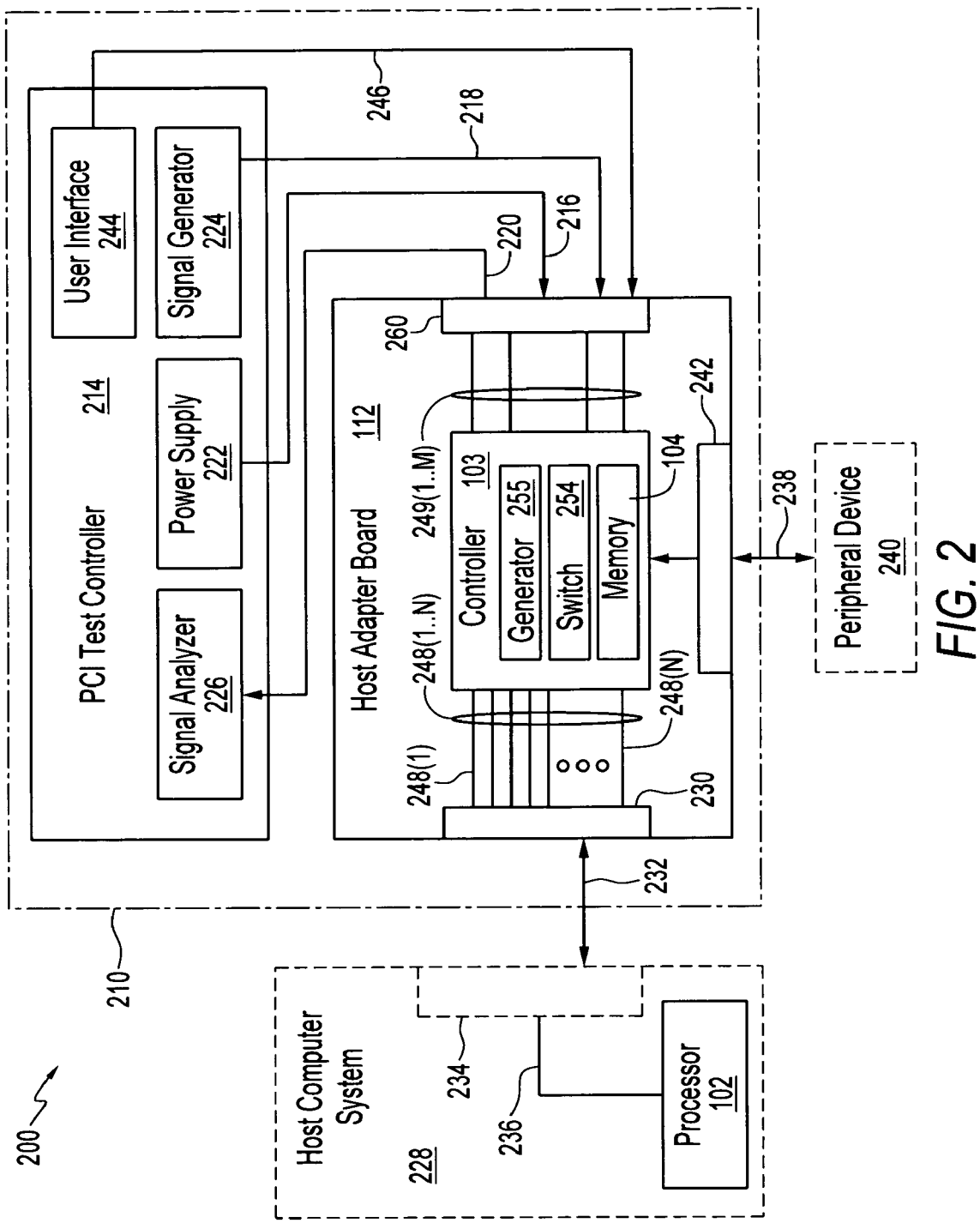
FIG. 2 illustrates a block diagram of an alternative data-processing system, which may be adapted for use in accordance with an embodiment.

FIG. 2 illustrates a block diagram of an alternative data-processing system 200, which may be adapted for use in accordance with an embodiment. Note that in FIGS. 1-2, identical or similar parts or elements are generally indicated by identical reference numerals. Thus, for example, the processor 102, the HAB 112 and the controller 103 depicted in FIG. 1 are also indicated in the context of the alternative system 200 depicted in FIG. 2.

System 200 can be adapted for use in testing or assessing the timing of PCI signals. System 200 can include the host adapter board (HAB) 112 and a PCI test controller 214. In operation, PCI test controller 214 supplies power 216 and clock signal 218 to HAB 112; it then measures timing signal 220 from HAB 112 so as to assess timing of PCI signals. Within PCI test controller 214, a power supply 222 provides power 216 to HAB 112, a signal generator 224 generates clock signal 218 applied to HAB 112, and a signal analyzer 226 assesses timing signal 220 so as to determine, for example, slew rate and clock-to-signal-valid delay.

For illustrative purposes, FIG. 1 also shows a host computer system 228. HAB 112 has a PCI connector 230 that mates (indicated by arrow 232) with a PCI connector 234 of host computer system 228 to connect HAB 112 to a PCI bus 236 of host computer system 228. PCI bus 236 then facilitates communications between an internal processor 102 of host computer system 228 and HAB 112, for example. Once connected to host computer 228, host adapter board 112 then in turn operates, for example, to communicate (indicated by arrow 238) between host computer system 228 and a peripheral device 240 (e.g., a hard drive); a protocol of communication 238 is for example SCSI. A separate connector 242 typically facilitates connection between HAB 112 and peripheral device 240.

PCI test controller 214 includes a user interface 244, which connects to HAB 112 through a signal line 246. User interface 244 and signal line 246 are used to initiate a "test mode" of HAB 112. When HAB 112 is in the test mode, internal circuitry of HAB 112 cycles through a series of addresses to toggle PCI signal lines 248(1 ... N) of HAB 112, to generate timing signal 220. PCI signal lines 248(1 ... N) connect with connector 230 and include N separate signal lines corresponding to the bit-width (e.g., 128-bits) of PCI bus 236. In one embodiment, the internal circuitry of HAB 112 includes a controller 103 with a memory 104, a switch 254 and a generator 255. Controller 103 can be for example an integrated circuit of HAB 112, such as an I/O controller operable to facilitate communications with peripheral device 240. Memory 104 can be for example a random access memory (RAM) of controller 103, and operates to store PCI signal addresses used to toggle PCI signal lines 248(1 ... N). Switch 254 is for example a mechanism that connects any one of PCI signal lines 248(1 ... N) to timing signal 220, as currently addressed by the PCI addresses within memory 104. Generator 255 is operable to generate PCI signals for HAB 12 in place of PCI control signals normally generated by host computer system 228 when communicating with HAB 112 over PCI bus 236.

Memory 104, switch 254 and generator 255 need not co-exist within a controller for peripheral device 240; they may instead be an integrated circuit of HAB 112 that is separate from control of peripheral device 240. Alternatively, they may be separate components or separate integrated circuits of HAB 112, as a matter of design choice. Other configurations of the internal circuitry 103, 104, 254, 255 are also possible to provide similar function without departing from the scope hereof.

In one embodiment, HAB 112 may be associated with a separate connector 260 that connects to signal lines 218, 220, 246 and power 216 of PCI test controller 214. Signal lines 218, 220, 246 and power 216 in turn couple with controller 103 through one or more signal and power lines 249(1 ... M), where M is an integer defined by the particular design of controller 50 and/or by other circuitry of HAB 12. Upon reading and fully appreciating this disclosure, it should however be apparent that connection between PCI test controller 214 and HAB 112 may occur in different ways such that connector 260 is not required. For example, PCI test controller 214 may represent separate devices cooperating together. In one example, an oscilloscope (or logic analyzer) operates as signal analyzer 226 and user interface 244; a jumper between the oscilloscope (i.e., or logic analyzer) and a line 249 of HAB 112 can thus be used to initiate a test mode of HAB 112. In another example, a separate power supply 222 supplies power 216 to HAB 112 and a separate signal generator 224 supplies clock signal 218 to HAB 112.

Figure 3:
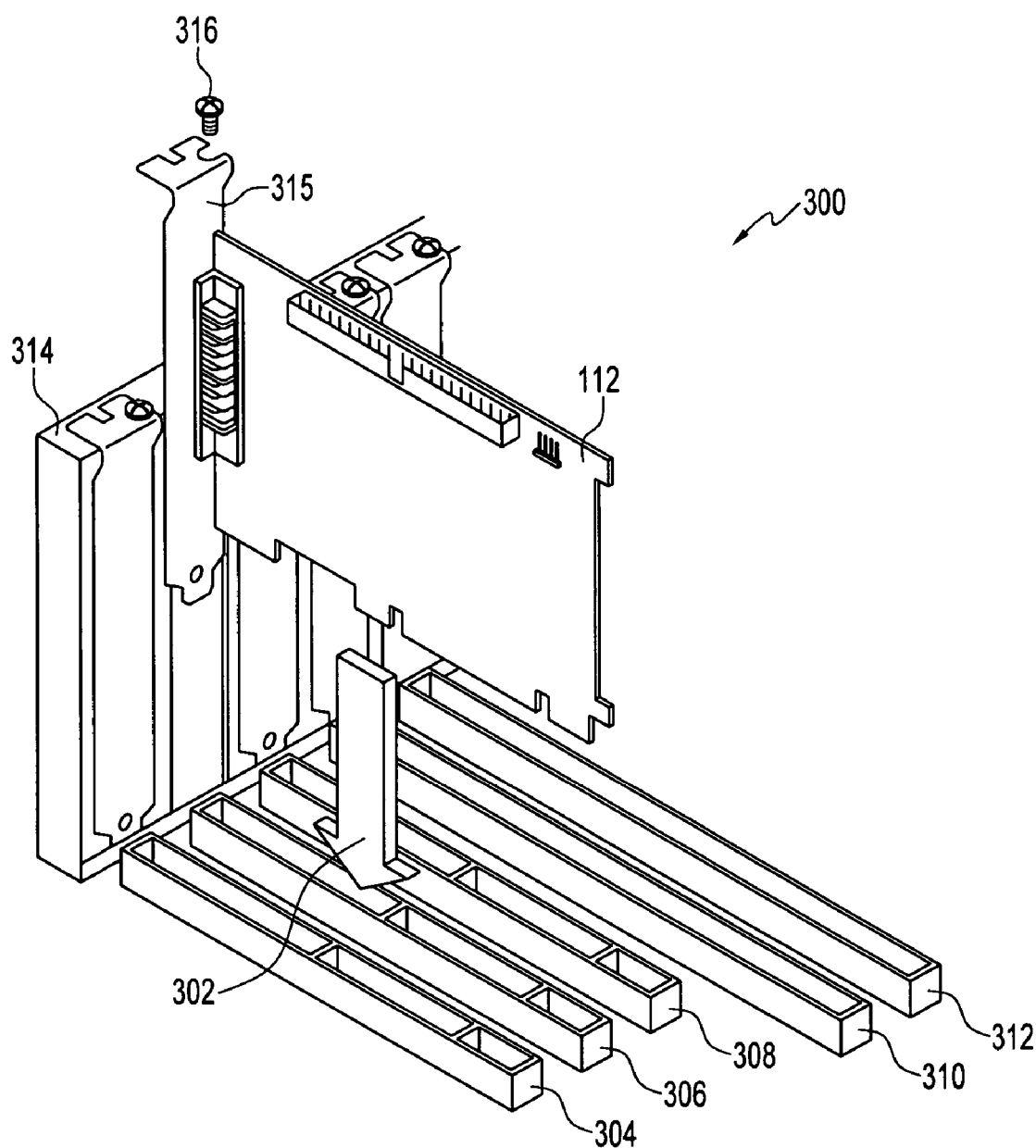
FIG. 3 illustrates a pictorial diagram illustrating a host adapter board (HAB), which may be utilized in accordance with an embodiment.

FIG. 3 illustrates a pictorial diagram illustrating a host adapter board (HAB) system 300, which may be utilized in accordance with one embodiment. HAB system 300 is generally composed of the adapter or HAB 112, which is connected to a bracket 315 that in turn is connected via screw 316 to a computer component 314 of a computer or data-processing system such as systems 100 or 200 described above. System 300 can be implemented in the context of a test system for testing boards or adapters such as HAB 112. Arrow 302 indicates the direction for modularly attaching HAB 112 to systems 100 or 200. A plurality of receiving slots 304, 306, 308, 310 and 312 can be positioned perpendicular to the computer component 314. Receiving slot 304, for example, can receive HAB 112 and maintain HAB 112 in place. It can be appreciated that the configuration depicted in FIG. 3 is presented for illustrative purposes only and is not considered a limiting feature of the embodiments disclosed herein. Slots 304, 306, 308, 310 and 312 can be implemented as a PCI adapter, card or board depending upon design considerations.

Figure 4:
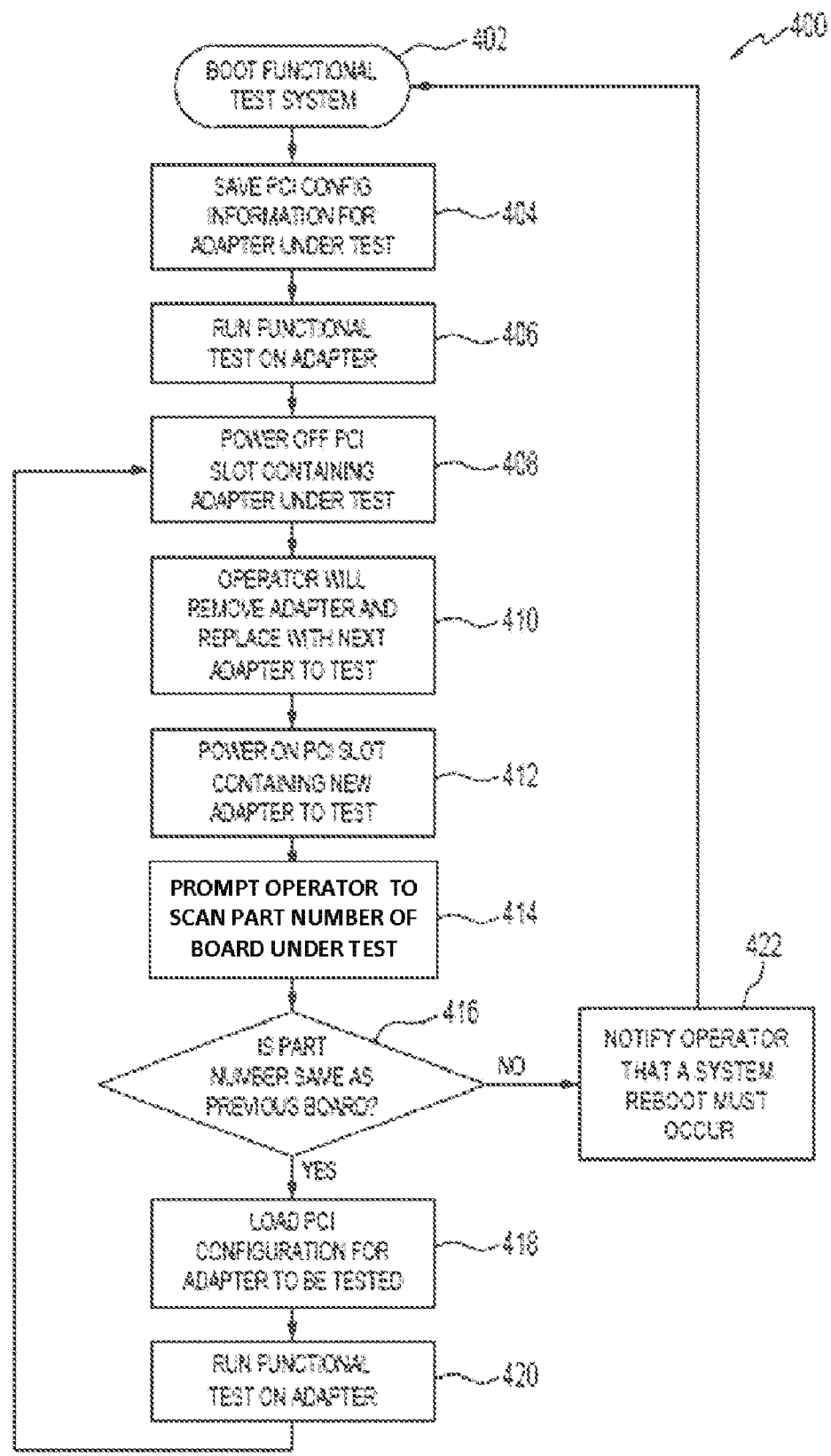
FIG. 4 illustrates a high-level flow chart of operations illustrating logical operational steps which can be implemented in accordance with a preferred embodiment.

FIG. 4 illustrates a high-level flow chart 400 of operations illustrating logical operational steps which can be implemented in accordance with a preferred embodiment. The process can begin, as indicated at block 402, wherein a boot functional test system operation is implemented. Thereafter, as depicted at block 404, PCI configuration information can be saved to an adapter under a test condition. The PCI configuration information is saved by our functional test program for the adapter under test. Next, as described at block 406, a functional test can be run on the adapter. Thereafter as indicated at block 408, a PCI slot containing the adapter can be powered off. Next, as depicted at block 410, an operator or user can remove the adapter (e.g., HAB 112) and replace it with a next adapter into one or more of the slots 304, 306, 308, 310 and 312 depicted in FIG. 3 as long as the same slot is used as the first adapter being tested.

Thereafter, as described at block 412, the PCI slot containing the new adapter to test can be powered off following processing of the operation described at block 414, wherein an operator or user is prompted to scan the part number of the board currently undergoing testing. Next as illustrated at block 416, a test can be performed to determine if the part number of the current adapter is the same as the previous board or adapter (e.g., HAB 112). If not, then the operation depicted at block 422 is processed, wherein the operator is notified that a system reboot must occur. If it is determined that the part number of the current adapter is the same as the previous adapter, then the PCI configuration is loaded for the adapter to be tested, as indicated at block 418. Thereafter, a functional test can be run on the adapter as illustrated at block 420. Following processing of the operation described at block 420, the operation depicted at block 408 can be repeated, followed by subsequent operations.

The methodology depicted in FIG. 4 can be implemented in the context of modules. In the computer programming arts, a module can be implemented as a collection of routines and data structures that performs particular tasks or implements a particular abstract data type. Modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based.

Thus, for example, the term module, as utilized herein generally refers to software modules or implementations thereof. Such modules can be utilized separately or together to form a program product that can be implemented through signal-bearing media, including transmission media and recordable media. The methodology disclosed in FIG. 4 can be implemented as a system composed of one or more such modules.

The foregoing methodology disclosed in FIG. 4 solves the problem associated with current manufacturing tests for HAB's, which requires the operators or users to manually reboot the test system, or to select an option that reboots the test system once the HAB has been changed out under test. These problems are avoided by capturing the PCI configuration registers according to the methodology of FIG. 4 for the HBA being tested and saving it in a binary file, thus saving and restoring the PCI configuration for the next HAB to be tested, without having to reboot the system.

By following this testing approach, the power to the slot where the HAB is being tested is turned off and the operator can then remove the board already tested and insert the next HAB to be tested. Power is then brought back to the slot thru software and the PCI configuration file is loaded. The test system is now able to communicate to the HAB and proceed to test this new card or board. Thus, as long as the same type of HAB is being tested and the same PCI slot is being used in the test system, by restoring the PCI configuration registers for the next HAB, once it is powered up, one can test this next HAB quickly, thereby reducing manufacturing times and costs.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for testing a modular data-processing component, comprising:
    identifying and storing register information associated with a modular data-processing component to be tested at a test location, said modular data-processing component comprising an HAB;
    testing said modular data-processing component, wherein testing said modular data-processing component comprises running a functional test on said modular data-processing component by supplying power and clock signal to said HAB then measuring timing signal from said HAB comprising slew rate or clock-to-signal-valid delay by cycling through a series of addresses to toggle a plurality of PCI signal lines of said HAB, wherein said plurality of PCI signal lines corresponds to a bit-width of a PCI bus;
    powering off said test location;
    thereafter removing said modular data-processing component from said test location;
    powering on said test location; and
    thereafter retrieving and providing said register information for use with testing of a new data-processing component at said test location without losing said register information during testing of multiple modular data-processing components thereby avoiding time consuming rebooting for testing of said modular data-processing component.

2. The method of claim 1 wherein said register information comprises PCI configuration data.

3. The method of claim 1 wherein said data-processing component comprises an adapter.

4. The method of claim 1 wherein said test location comprises a PCI testing slot provided by a data-processing system.

5. The method of claim 1 wherein said testing said modular data-processing component comprises a PCI test controller which connects to said HAB through a signal line to initiate a test mode of said HAB to cycle through a series of addresses to toggle said signal lines to generate timing signals.

6. The method of claim 1 further comprising determining if said new data-processing component comprises a same identification value as associated with a preceding data-processing component.

7. The method of claim 6 wherein said register information is provided for use with testing of said new data-processing component at said test location if said identification value is the same as associated with said preceding data-processing component.

8. A method for testing a modular data-processing component, comprising:
identifying and storing register information associated with a modular data-processing component to be tested at a test location, wherein said modular data-processing component comprises an HAB and said register information comprises PCI configuration data;
testing said modular data-processing component by supplying power and clock signal to said HAB then measuring timing signal from said HAB comprising slew rate or clock-to-signal-valid delay by cycling through a series of addresses to toggle a plurality of PCI signal lines of said HAB, wherein said plurality of PCI signal lines corresponds to a bit-width of a PCI bus;
powering off said test location;
thereafter removing said modular data-processing component from said test location, wherein said test location comprises a PCI testing slot provided by a data-processing system;
powering on said test location; and
thereafter retrieving and providing said register information for use with testing of a new data-processing component at said test location without losing said register information during testing of multiple modular data-processing components thereby avoiding time consuming rebooting for testing of said modular data-processing component.

9. The method of claim 8 further comprising determining if said new data-processing component comprises a same identification value as associated with a preceding data-processing component.

10. The method of claim 9 wherein said register information is provided for use with testing of said new data-processing component at said test location if said identification value is the same as associated with said preceding data-processing component.

11. A data-processing system for testing a modular data-processing component, comprising:
a module for identifying and storing register information associated with a modular data-processing component to be tested at a test location, said modular data processing component comprising a HAB;
a module for testing said modular data-processing component by supplying power and clock signal to said HAB then measuring timing signal from said HAB comprising slew rate or clock-to-signal-valid delay, wherein said module is comprises an oscilloscope logic analyzer for combined operation as a signal analyzer, a user interface, and a jumper between said oscilloscope logic analyzer and a line of said HAB for initiating a test mode of said HAB;
a module to power off and power on said test location;
a module for removing said modular data-processing component from said test location; and
a module for thereafter retrieving and providing said register information for use with testing of a new data-processing component at said test location without losing said register information during testing of multiple modular data-processing components thereby avoiding time consuming rebooting for testing of said modular data-processing component.

12. The system of claim 11 wherein said register information comprises PCI configuration data.

13. The system of claim 11 wherein said module for testing said modular data-processing component comprises a module for running a functional test on said modular data-processing component.

14. The system of claim 11 wherein said test location comprises a PCI testing slot provided by a data-processing system.

15. The system of claim 11 wherein said module for testing said modular data-processing component comprises a PCI test controller which connects to said HAB through a signal line to initiate a test mode of said HAB to cycle through a series of addresses to toggle said signal lines to generate timing signals.

16. The system of claim 11 further comprising determining if said new data-processing component comprises a same identification value as associated with a preceding data-processing component.

17. The system of claim 16 wherein said register information is provided for use with testing of said new data-processing component at said test location if said identification value is the same as associated with said preceding data-processing component.

* * * * *